April 20, 1965　　　G. SPAKMAN ETAL　　　3,179,737
METAL CASING IN PARTICULAR FOR MOTOR CAR RADIO
RECEIVER HAVING A DETACHABLE COVER
Filed Oct. 5, 1960

INVENTOR
Geert Spakman
Lucas W. M. Sekijven
BY
Frank R. Trifari
AGENT

United States Patent Office 3,179,737
Patented Apr. 20, 1965

3,179,737
METAL CASING IN PARTICULAR FOR MOTOR CAR RADIO RECEIVER HAVING A DETACHABLE COVER
Geert Spakman and Lucas Wilhelmus Martinus Schijven, Eindhoven, Netherlands, assignors to North American Philips Company, Inc., New York, N.Y., a corporation of Delaware
Filed Oct. 5, 1960, Ser. No. 60,632
Claims priority, application Netherlands, Oct. 12, 1959, 244,255
2 Claims. (Cl. 174—50)

This invention relates to a metal casing, in particular for motor car radio receiver, comprising a box having a detachable cover, which along at least two edges is connected to the box by means of each time one needle or stud which, in the manner of a hinge, is partially embraced alternately by bent lugs formed on the cover and on the box. The cover in this construction may be removed after withdrawing the studs and the fixing of the cover occurs very simply by again inserting the studs after replacing the cover.

The object of the present invention is to provide a casing of the said type which is easy to manufacture and in which the electric contact between box and cover is ensured in a number of points along the edges to be connected together, as a result of which the casing forms a reliable electric screening for the electric apparatus provided in it. This is of particular importance in the case of motor car radio receivers, since these have to operate in the immediate proximity of the interference source, constituted by the ignition of the motor car engine, without receiving the interference caused by it.

According to the invention this object is reached in that at least every second lug embracing the stud is in mechanical and electrical contact, directly or via the stud situated opposite said lug, with an additional lug forming part of the other casing member.

Figure 1:
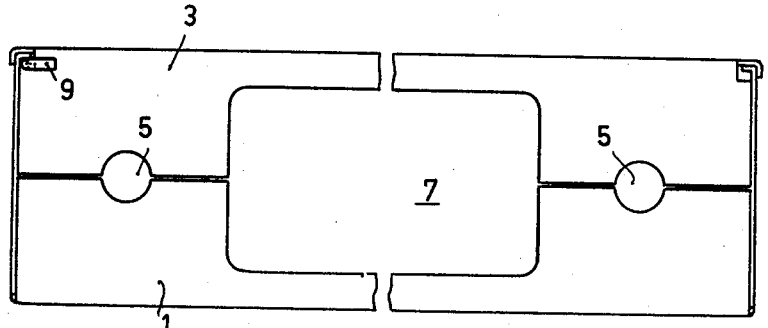
Figure 2:
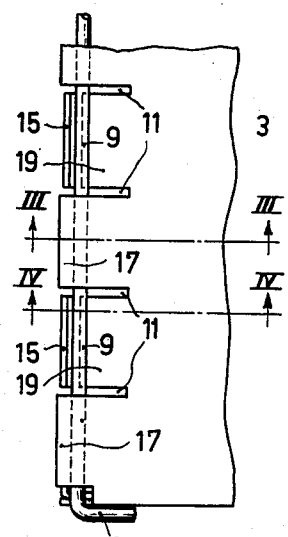
Figure 3:
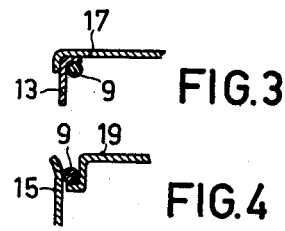
Figure 4:
Figure 7:
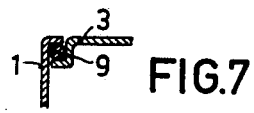
Figure 8:
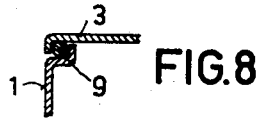
Figure 9:
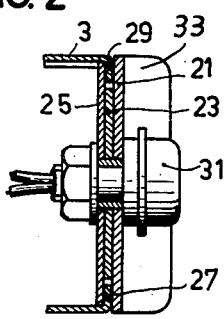

In order that the invention may be readily carried into effect, it will now be described in greater detail, by way of example, with reference to the accompanying drawing, in which:

FIG. 1 is a front elevation of one embodiment,

FIG. 2 is a plan view on an exaggerated scale of a detail of the device shown in FIG. 1, FIGS. 3 and 4 are sectional views along the lines III—III and IV—IV respectively of FIG. 2, FIGS. 5 and 6 and 7 and 8 respectively are sectional views in two other embodiments in the corresponding positions as in FIGS. 3 and 4, FIG. 9 is a vertical sectional view of the rear wall of the casing shown in FIG. 1 taken at right angles to this wall. In FIGS. 3 to 8 only the metal parts through which the section is taken are shown for reasons of clearness.

FIG. 1 shows the front of the metal casing of a motor car radio receiver, comprising a box-shaped part 1 provided with a cover 3. As shown in FIG. 1, a bent edge part of the cover 3 and a similarly bent edge part of the box 1 form together the front of the casing, comprising two circular apertures 5 for the passage of the operating shafts of the receiver and a rectangular aperture 7 for receiving the tuning dial of the apparatus.

The cover 3 is connected to the box 1 by means of two, for example stainless steel, studs 9 (one of which is not shown in FIG. 1 for reasons of clarity) which, in the manner of a hinge, are at least partially embraced alternately by bent lugs formed on the cover and on the box. In the embodiment shown, box and cover are secured together along the two side edges of the casing.

The way in which this is preferably done is shown in FIGS. 2, 3, and 4. The edges to be secured together (FIG. 2 shows the left-hand side edge of the casing) of box and cover are subdivided into lugs 13, 15 and 17 and 19 respectively by transverse notches 11, of which lugs some partially embrace the stud or needle 9 (see FIGS. 3 and 4). At least every second lug embracing the stud 9, in this case the lugs 13 forming part of the box 1, is in direct mechanical and electrical contact with an additional lug 17 situated opposite this lug and forming part of the other box part, in this case the cover 3, as a result of which an electric connection is formed on the spot between the two casing parts which connection is entirely independent of the fact whether the lugs in question are in electric connection with the stud 9 or not. As shown in FIGS. 3 and 4 a firm connection between cover and box is also obtained without it being necessary for the lugs 13 and 19 in question to embrace the stud entirely as is the case with a hinge, as a result of which the manufacture of the casing is considerably simplified. The end of the additional lug 17 preferably embraces the end of the lug 13 as shown in FIG. 3 which will benefit the rigidity of the connection.

As is shown in FIG. 4, the lugs 15 forming part of the box 1 are connected, via the stud 9, to the lugs 19 forming part of the cover 3. So in this case no direct connection is present it is true, but the length of the connection generally is not more than the diameter of the stud 9 so that in this case also a very good electrical connection is obtained. It appears that the thus obtained screening amply meets the very stringent requirements to be imposed on motor car radio receivers. In the case of somewhat less stringent requirements, the lug 15 may be omitted, if desired, since it is not indispensable for the mechanical connection. In this case also, electric contact between box and cover is ensured in a number of points along the connection edge by the direct contact between the lugs 13 and 17.

In the embodiment shown in FIG. 1, metal bearing bushings (not shown) for the operating shafts may be screwed into the apertures 5, which bearing bushings then form at the same time electric connections between box and cover.

Figure 5:
Figure 6:

FIGS. 5 and 6 show a self-explanatory embodiment. In this case, the stud 9 is on the outside of the casing which may be of advantage if the whole room inside the casing is to be used for the apparatus.

FIGS. 7 and 8 show a third embodiment, in which nowhere direct contact between two opposed lugs is present and this contact is invariably effected via the stud 9. In electric respect this is somewhat less favourable than the embodiments shown in the preceding figures; however, an advantage of this construction is that only comparatively slight requirements are to be imposed on the accuracy of the manufacture without harmfully influencing the electric connection between box and cover.

The rear wall of the apparatus casing described may consist of a comparatively thick metal sheet 21 (see FIG. 9), to which two other metal sheets 23 and 25 are connected. As shown in FIG. 9, an annular groove is formed between the sheets 21 and 25, in which lugs are situated formed by bending the four rear edges of the assembly of box 1 and cover 3 inwards at right angles (in the figure only the lower lug 27 formed on the box 1 and the upper lug 29 formed on the cover are shown), so that between box and cover on the one hand and the rear wall on the other a labyrinth packing is obtained.

Transistors 31 for comparatively large power may be provided on the rear wall 21, 23 and 25 which transistors also hold the three plates 21, 23 and 25. For dissipating the heat produced in the transistors, cooling fins 33 may be provided on the wall 21.

What is claimed is:

1. A metal casing of the type used in automobile radios comprising a box portion and a detachable cover portion, said box and cover portions being provided with a plurality of bent lugs projecting therefrom, a stud removably attaching said cover portion to said box portion along at least two edges of said cover portion, said stud being at least partly embraced alternately by lugs on said box and cover portions respectively, at least every second lug on one of the portions of said casing making a mechanical and electrical contact directly with another lug on the other portion of said casing, said cover portion being provided with a bent edge which forms part of the front of the casing, said box portion having a bent edge forming the other part of the front of said casing and co-extensive with the front part of said casing, and a plurality of apertures being provided between said bent edges for accommodating means for connecting said two parts together.

2. A metal casing of the type used in automobile radios comprising a box portion and a detachable cover portion, said box and cover portions being provided with a plurality of bent lugs projecting therefrom, a stud removably attaching said cover portion to said box portion along at least two edges of said cover portion, said stud being at least partly embraced alternately by lugs on said box and cover portions respectively, at least every second lug on one of the portions of said casing making a mechanical and electrical contact directly with another lug on the other portion of said casing, said cover portion being provided with a bent edge which forms part of the front of the casing, said box portion having a bent edge forming the other part of the front of said casing and co-extensive with the front part of said casing, and a plurality of apertures being provided between said bent edges for accommodating means for connecting said two parts together, the rear of said casing being provided with spaced metal sheets thereby forming an annular groove, the rear bent lugs being located in said annular groove after bending the rear edges of said box and cover inwardly at right angles.

References Cited by the Examiner
UNITED STATES PATENTS

| | | | |
|---|---|---|---|
| 733,568 | 7/03 | Sundh | 174—50 |
| 1,336,895 | 4/20 | Driver | 220—7 |
| 1,650,233 | 11/27 | Plunkett | 174—52 |
| 1,883,553 | 10/32 | Chain | 220—4 |
| 2,623,981 | 12/52 | Anderson | 174—35 |
| 2,629,764 | 2/53 | Wiley | 174—35 |

FOREIGN PATENTS 671,589    9/29    France.

JOHN F. BURNS, *Primary Examiner.*

E. J. DRUMMOND, JOHN P. WILDMAN, *Examiners.*